US012655040B2

(12) United States Patent
Sparrow et al.

(10) Patent No.: US 12,655,040 B2
(45) Date of Patent: Jun. 16, 2026

(54) CRYSTALLIZATION OF SALTS FROM HIGH PRESSURE REVERSE OSMOSIS CONCENTRATE

(71) Applicant: SALTWORKS TECHNOLOGIES INC., Richmond (CA)

(72) Inventors: Benjamin Sparrow, Richmond (CA); Megan Low, Richmond (CA)

(73) Assignee: SALTWORKS TECHNOLOGIES INC., Richmond (CA)

( * ) Notice: Subject to any disclaimer, the term of this patent is extended or adjusted under 35 U.S.C. 154(b) by 662 days.

(21) Appl. No.: 17/799,911

(22) PCT Filed: Mar. 1, 2021

(86) PCT No.: PCT/CA2021/050259
§ 371 (c)(1),
(2) Date: Aug. 15, 2022

(87) PCT Pub. No.: WO2021/174344
PCT Pub. Date: Sep. 10, 2021

(65) Prior Publication Data
US 2023/0065608 A1 Mar. 2, 2023

Related U.S. Application Data

(60) Provisional application No. 62/984,082, filed on Mar. 2, 2020.

(51) Int. Cl.
*C02F 1/44* (2023.01)
*B01D 63/10* (2006.01)
(Continued)

(52) U.S. Cl.
CPC ............ *C02F 1/441* (2013.01); *B01D 63/107* (2022.08); *C02F 1/265* (2013.01); *C02F 9/00* (2013.01);
(Continued)

(58) Field of Classification Search
CPC .. C02F 1/441; C02F 1/265; C02F 9/00; C02F 2001/5218; C02F 2103/08;
(Continued)

(56) References Cited

FOREIGN PATENT DOCUMENTS

| CN | 106396234 A | 2/2017 | |
|----|-------------|--------|------------|
| CN | 108409050 A * | 8/2018 | ................ C02F 9/00 |

(Continued)

OTHER PUBLICATIONS

ZLD Without Evaporation: Saltworks Achieves First ZLD With a Membrane Crystallizer (Year: 2020).*

(Continued)

*Primary Examiner* — Bobby Ramdhanie
*Assistant Examiner* — William Addison Geisbert
(74) *Attorney, Agent, or Firm* — Tarolli, Sundheim, Covell & Tummino LLP

(57) ABSTRACT

Zero liquid discharge systems, processes, and techniques for treating a saltwater without evaporative crystallization. The saltwater is treated by a fluidic circuit comprising a high-pressure reverse osmosis ("HPRO") unit configured to operate at a hydraulic pressure of at least 1,500 psi, a cooling crystallizer, and a solids-liquid separator. The saltwater is first concentrated by the HPRO unit to produce an HPRO brine, which is subsequently cooled to a designated crystallization temperature by the cooling crystallizer. The cooling crystallizer crystallizes salt crystals from the cooled HPRO brine and produces a salt-diminished brine. The solids-liquid separator separates the salt-diminished brine from the salt crystals. The salt-diminished brine from the solids-liquid separator is returned to the HPRO unit for further treatment, which allows additional salts to be crystallized from the returned salt-diminished brine.

17 Claims, 2 Drawing Sheets

(51) Int. Cl.
  *C02F 1/26*          (2023.01)
  *C02F 1/52*          (2023.01)
  *C02F 9/00*          (2023.01)
  *C02F 103/08*        (2006.01)
(52) U.S. Cl.
  CPC ........................... *B01D 2311/251* (2022.08);
        *C02F 2001/5218* (2013.01); *C02F 2103/08*
        (2013.01); *C02F 2201/002* (2013.01); *C02F*
                                    *2209/02* (2013.01)
(58) Field of Classification Search
  CPC ..................... C02F 2201/002; C02F 2209/02;
              C02F 1/004; B01D 63/107; B01D
            2311/251; B01D 61/025; B01D 71/56;
              B01D 9/0013; B01D 9/0059; B01D
              9/0063; B01D 2321/06; C01D 5/16;
                    C01D 7/24; Y02A 20/131
  See application file for complete search history.

(56)                References Cited

FOREIGN PATENT DOCUMENTS

EP           3543565  A1 *  9/2019  .............. B01J 3/048
WO     WO-2019046628  A1 *  3/2019  ............. B01D 61/58
WO     WO-2019165720  A1 *  9/2019  ............... C01D 5/00

OTHER PUBLICATIONS

Saltworks.com "Reverse Osmosis Brine Treatment: Tech Advancements to Minimize Volume & Cost" (Year: 2019).*
Davenport, D. M., et al., « High-Pressure Reverse Osmosis for Energy-Efficient Hypersaline Brine Desalination : Current Status, Design Considerations, and Research Needs », Environmental Science and Technology Letters, 5(8), pp. 467-475, Jun. 29, 2018.
Applicant: Saltworks Technologies Inc.; "Crystallization of Salts From High Pressure Reverse Osmosis Concentrate"; International Application No. PCT/CA2021/050259 Filed: Mar. 1, 2021; PCT International Search Report and Written Opinion May 13, 2021; 7 pgs.
CA Office Action for corresponding Canadian Patent Application No. 3,169,028, dated Sep. 12, 2024, 5 pages.
Lu K.J. et al: "Design of Zero Liquid Discharge Desalination (ZLDD) Systems Consisting of Freeze Desalination, Membrane Distillation, and Crystallization Powered by Green Energies", Desalination, 458, pp. 66-75, Feb. 21, 2019.
Guan G. et al: "Analysis of Membrane Distillation Crystallization System for High Salinity Brine Treatment with Zero Discharge Using Aspen Flowsheet Simulation", Industrial & Engineering Chemical Research, 51/41, pp. 13405-13413, Sep. 7, 2012.

* cited by examiner

CRYSTALLIZATION OF SALTS FROM HIGH PRESSURE REVERSE OSMOSIS CONCENTRATE

CROSS-REFERENCE TO RELATED APPLICATION

This application is a U.S. National Stage Application filed under 35 U.S.C. § 371 of PCT/CA2021/050259, filed Mar. 1, 2021, and entitled CRYSTALLIZATION OF SALTS FROM HIGH PRESSURE REVERSE OSMOSIS CONCENTRATE, which International Application claims the benefit of priority from U.S. Provisional Patent Application No. 62/984,082, filed on Mar. 2, 2020. The entire contents of each of the above-identified patent applications are incorporated herein by reference.

TECHNICAL FIELD

The present disclosure relates to zero liquid discharge systems, processes and techniques to crystallize salts from a saltwater without evaporative crystallization.

BACKGROUND

A desalination process treats a feed saltwater and produces 1) a product water for a particular end-use (e.g. as potable water) and 2) a high salinity (e.g. >60,000 mg/L) brine that contains the original salts from the feed saltwater. Managing the high salinity brine is a challenge for industry and is a major barrier when deploying desalination technologies. Zero liquid discharge ("ZLD") desalination technologies, which often use thermal energy to evaporate water and to make solid salts, have been used to dispose of high salinity brine.

SUMMARY

According to a first aspect, there is provided a process for crystallizing solid salts from a saltwater, the process comprising: applying reverse osmosis at a hydraulic pressure of at least 1,500 psi to a fluid comprising at least one of the saltwater and a returned salt-diminished brine from treating the saltwater with the process to produce a permeate and a concentrated brine from the fluid; cooling the concentrated brine to crystallize the solid salts and to produce a salt-diminished brine from the concentrated brine; separating at least some of the solid salts and the salt-diminished brine from each other; and returning at least some of the separated salt-diminished brine as the returned salt-diminished brine.

The process may further comprise controlling a temperature of the fluid such that the temperature of the fluid is within a range of 10 to 30 degrees Celsius when the reverse osmosis is applied.

The process may further comprise monitoring the temperature of the fluid and controlling the temperature in response to the monitoring.

The process may further comprise cooling the concentrated brine by transferring heat energy from the concentrated brine to the returned salt-diminished brine.

The returned salt-diminished brine may have a temperature of less than 15 degrees Celsius prior to receiving the heat energy from the concentrated brine.

The concentrated brine may have a total dissolved solids content of at least 150,000 mg/L.

The solid salts may comprise at least one of sodium bicarbonate crystals, sodium carbonate hydrate crystals, sodium sulfate hydrate crystals and potassium sulfate crystals.

The reverse osmosis may be applied using a high-pressure reverse osmosis unit comprising a spiral wound module.

The reverse osmosis may be applied using a high-pressure reverse osmosis unit comprising a thin-film composite membrane that comprises a polyamide selective layer.

The reverse osmosis may be applied at a hydraulic pressure of no more than 6,000 psi.

According to another aspect, there is provided a system for crystallizing solid salts from a saltwater, the system comprising: a high-pressure reverse osmosis ("HPRO") unit configured to operate at a hydraulic pressure of at least 1,500 psi, the HPRO unit comprising an inlet for receiving a fluid comprising at least one of the saltwater and a returned salt-diminished brine resulting from treating the saltwater by the system, a permeate outlet for outputting a permeate, and a brine outlet for outputting a concentrated brine; a cooling crystallizer fluidly coupled to the brine outlet to receive the concentrated brine, wherein the cooling crystallizer is configured to cool the concentrated brine to crystallize the solid salts from the concentrated brine and to produce a salt-diminished brine; a solids-liquid separator fluidly coupled to the cooling crystallizer to receive the solid and salts and the salt-diminished brine, the solids-liquid separator configured to separate at least some of the solid salts from the salt-diminished brine; and a return conduit fluidly coupling the solids-liquid separator to the inlet of the HPRO unit for returning at least a portion of the salt-diminished brine as the returned salt-diminished brine.

The system may further comprise a temperature controlling means fluidly coupled to the inlet of the HPRO unit for controlling a temperature of the fluid to be within a range of 10 to 30 degrees Celsius at the inlet of the HPRO unit.

The system may further comprise a temperature monitoring means fluidly coupled to the inlet of the HPRO unit for monitoring a temperature of the fluid, and the temperature controlling means may control the temperature in response to temperature monitoring performed by the temperature monitoring means.

The system may further comprise a heat energy transfer means fluidly coupled to the brine outlet of the HPRO unit and the return conduit for transferring heat energy from the concentrated brine to the returned salt-diminished brine in the return conduit.

The HPRO unit may comprise a spiral wound module.

The HPRO unit may comprise a thin-film composite membrane comprising a polyamide selective layer.

The HPRO unit may be configured to operate at a hydraulic pressure of up to 6,000 psi.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

For the sake of clarity, not every component is labeled, nor is every component of each embodiment shown where illustration is unnecessary to allow those of ordinary skill in the art to understand the embodiments described herein.

DETAILED DESCRIPTION

Membrane-based reverse osmosis ("RO") technology is a leading desalination technology due to its energy efficiency. However, as it is generally operated at less than about 1,200 psi, existing RO processes (e.g. seawater reverse osmosis) are generally limited to treating feed saltwaters of relatively low salinity (e.g. <35,000 mg/L total dissolved solids) and cannot produce solid salts directly. The brine output by existing RO technology ("RO concentrated brine") typically comprises a maximum of about 70,000 mg/L total dissolved solids, which corresponds to an inherent osmotic pressure of about 850 psi. RO concentrated brine from existing RO processes is generally treated by thermal evaporation for ZLD, which is energy-intensive and expensive to operate. In at least some example embodiments disclosed herein, a ZLD system is used to crystallize salts from a feed saltwater without evaporative crystallization. The ZLD system comprises a fluidic circuit comprising a high-pressure reverse osmosis ("HPRO") unit configured to operate at a hydraulic pressure of at least 1,500 psi, a cooling crystallizer, and a solids-liquid separator. At least some example embodiments provide systems and methods to concentrate a saltwater using the HPRO unit to produce an at least partially desalinated product water and an HPRO concentrated brine, which is subsequently cooled in the cooling crystallizer to a designated crystallization temperature. The cooling crystallizer is used to crystallize salts from the cooled HPRO brine to produce solid salts and a salt-diminished brine. The solids-liquid separator separates the salt-diminished brine from the solid salts. The salt-diminished brine from the solids-liquid separator is returned to an input of the fluidic circuit and is treated again by the fluidic circuit to generate more product water and solid salts.

Figure 1:
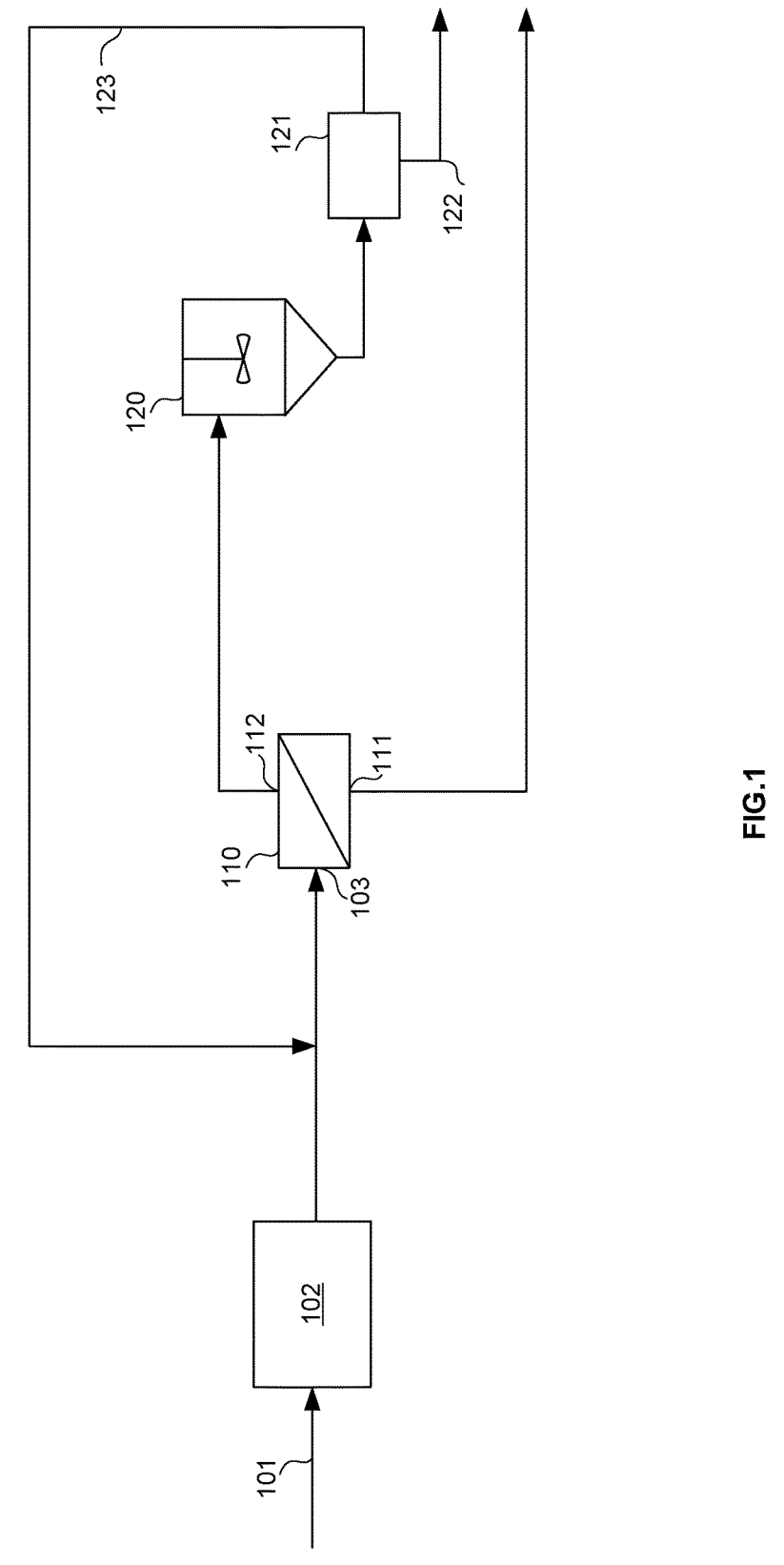
FIGS. 1 and 2 are schematic diagrams, each illustrating an example embodiment of a zero liquid discharge system comprising a fluidic circuit comprising a high-pressure reverse osmosis unit that is configured to operate at a hydraulic pressure of at least 1,500 psi, a cooling crystallizer, and a solids-liquid separator.

FIG. 1 is a schematic diagram illustrating an example embodiment of a ZLD system 100 for crystallizing salts from a feed saltwater. The feed saltwater may be a concentrated brine (e.g. with >70,000 mg/L total dissolved solids) comprising at least one of sodium bicarbonate, sodium carbonate, sodium sulfate and potassium sulfate salts. The source of the feed saltwater can be from any one or more various industrial processes; for example, the feed saltwater may be a wastewater comprising sodium sulfate generated by the coal chemical industry, or a wastewater comprising sodium carbonate from a carbonate leaching process. The system 100 comprises a fluidic circuit comprising:

(a) an HPRO unit 110 configured to operate at a hydraulic pressure of at least 1,500 psi comprising an inlet 103, a permeate outlet 111 for the product water, and a brine outlet 112 for the high salinity brine;

(b) a cooling crystallizer 120 fluidly coupled to the brine outlet 112;

(c) a solids-liquid separator 121 fluidly coupled to the cooling crystallizer 120; and (d) a return conduit 123 fluidly coupling the solids-liquid separator 121 and the HPRO inlet 103.

In at least some embodiments, the system 100 further comprises a pretreatment unit 102 positioned upstream of the inlet 103 of the HPRO unit 110 to pretreat the feed saltwater introduced via a source conduit 101 to the system 100. The pretreatment unit 102 may comprise one or more of a seawater reverse osmosis unit, a nanofiltration unit, a microfiltration unit, an ultrafiltration unit, and a pH adjustment unit.

In at least some embodiments, a membrane within the HPRO unit 110 is a thin-film composite membrane with a polyamide selective layer, and the HPRO unit 110 comprises a spiral wound module. Compared to a disk-tube module-based HPRO unit, the spiral wound module-based HPRO unit 110 used in at least some embodiments herein has a higher active membrane surface and is thus more energy-efficient when used to concentrate the feed saltwater when operating at a hydraulic pressure of at least 1,500 psi. Upper pressure limit in at least some example embodiments depends on the membrane's pressure compatibility; an upper pressure limit may be, for example approximately 6,000 psi.

In at least some embodiments, the cooling crystallizer 120 comprises a cooling means (e.g. a heat exchanger), a mixer (e.g. a stirrer or a mixing pump) and a container (e.g. a tank) (not shown in the FIG. 1). The cooling crystallizer 120 may comprise one or more of a continuous cooling crystallizer, a scraped surface crystallizer, a surface cooling crystallizer, and a vacuum cooling crystallizer. The solids-liquid separator 121 unit may comprise one or more of a bag filter, a centrifuge, a drum filter, a hydrocyclone, and a vacuum belt filter. In the embodiment shown in FIG. 1, the cooling crystallizer 120 and the solids-liquid separator 121 are distinct units. In an alternative embodiment (not shown), the cooling crystallizer 120 and the solids-liquid separator 121 may be built as an integrated unit.

According to at least some embodiments, a process that uses the system 100 for crystallizing solid salts from a saltwater comprises:

(a) applying reverse osmosis, such as by using the HPRO unit 110, to a fluid comprising at least one of the saltwater and a returned salt-diminished brine from treating the saltwater using the process at a hydraulic pressure of at least 1,500 psi to produce a permeate and a concentrated brine from the saltwater;

(b) cooling, such as by using the cooling crystallizer 120, the concentrated brine to crystallize the solid salts and to produce a salt-diminished brine from the concentrated brine;

(c) separating, such as by using solids-liquid separator 121, at least some of the solid salts and the salt-diminished brine from each other; and (d) returning at least some of the separated salt-diminished brine as the returned salt-diminished brine.

In operation, the feed saltwater is introduced via the source conduit 101 into the system 100. Before being directed to the inlet 103 of the HPRO unit 110, the saltwater may be pretreated by a pretreatment process using the pretreatment unit 102 to pre-concentrate the saltwater or to remove suspended solids, scaling components, greases, and/or oils. The pretreatment may include one or more seawater reverse osmosis, nanofiltration, microfiltration, ultrafiltration, and pH adjustment.

According to at least some embodiments, the concentrated brine produced from the HPRO unit 110 has a total dissolved solids ("TDS") content of at least 150,000 mg/L, which is 2 times higher than that of a brine output from a typical seawater reverse osmosis process. The HPRO concentrated brine is directed via the brine outlet 112 to the cooling crystallizer 120. The product water in the form of the HPRO permeate is discharged via the permeate outlet 111 out of the system 100. In at least some embodiments, the concentrated brine is cooled to a temperature less than 10°

5

C. within the cooling crystallizer 120. As the temperature of the concentrated brine decreases, solubilities of some salts, for example, one or more of sodium bicarbonate, sodium carbonate, sodium sulfate and potassium sulfate, in the concentrated brine decrease. These salts crystalize out from the cooled concentrated brine, producing a salt-diminished brine and solid salts, such as one or more of sodium bicarbonate crystals, sodium carbonate hydrate crystals, sodium sulfate hydrate crystals and potassium sulfate crystals. The solid salts and the salt-diminished brine are directed to the solids-liquid separator 121, where they are separated from each other. The separated salt solids are discharged via a conduit 122 out of the system 100, and at least a portion of the salt-diminished brine is returned via the return conduit 123 to the inlet 103 of the HPRO unit 110. The returned salt-diminished brine may be fed alone or be mixed and then fed together with the feed saltwater to the fluidic circuit for further permeate generation and salt crystallization.

The system 100 is illustrated in FIG. 1 as operating in a "once through" continuous mode. However, in an alternative embodiment (not depicted) it may be operated in a batch or semi-batch mode by recirculating various liquids through suitable valves, conduits, and pumps (not depicted).

Figure 2:
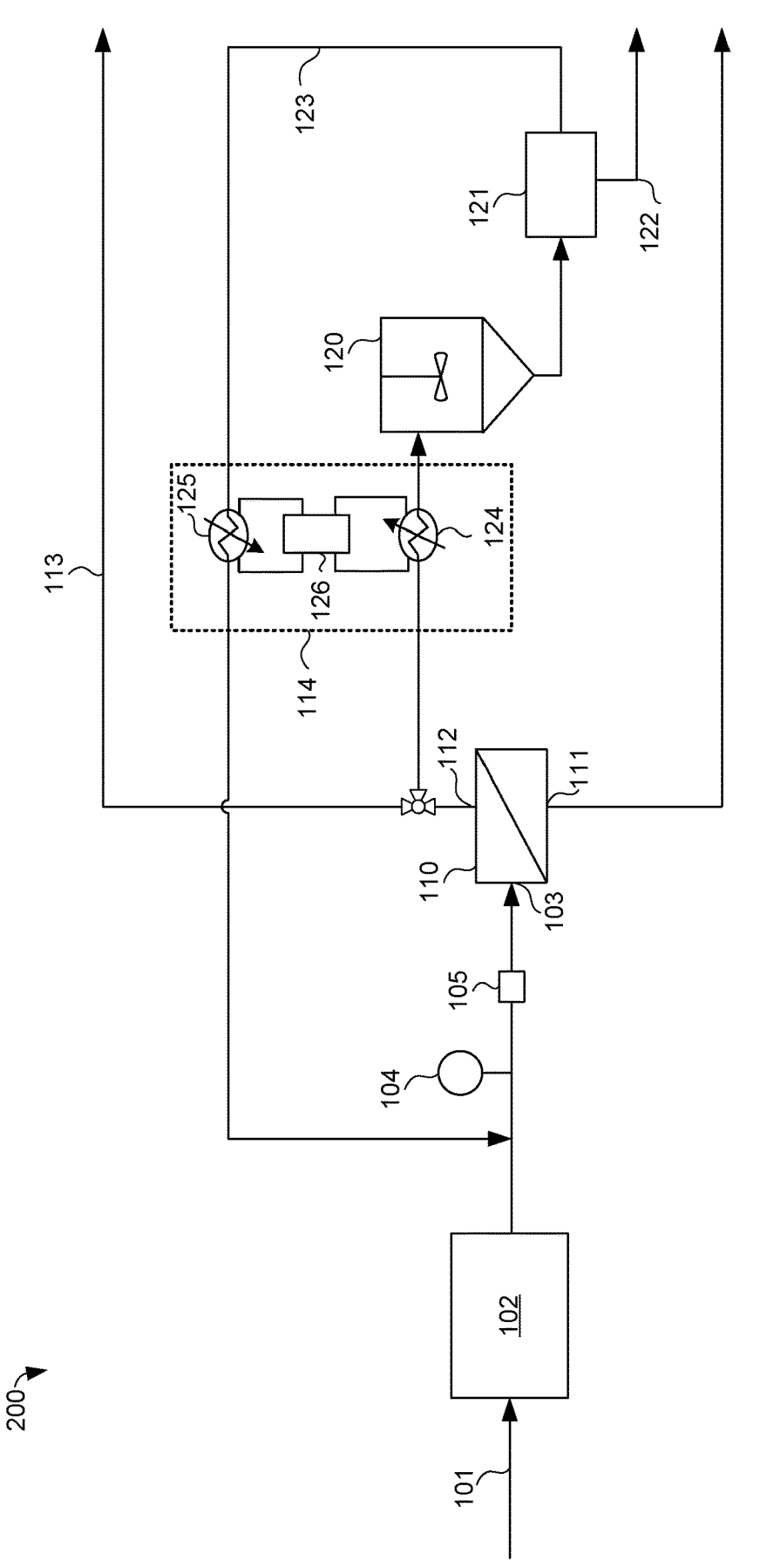

FIG. 2 is schematic illustration of another embodiment of a ZLD system 200 for crystallizing salts from a feed saltwater. The system 200 comprises the system 100 of FIG. 1, and further comprises a temperature monitoring means 104 and a temperature controlling means 105 positioned in serial upstream of the inlet 103 of the HPRO unit 110 and downstream of the pretreatment unit 102, a discharge conduit 113 fluidly coupled to the brine outlet 112 of the HPRO unit 110 to discharge brine generated by the HPRO unit 110 from the system 200, and a heat energy transfer means 114 fluidly coupled between the brine outlet 112 and the return conduit 123.

The temperature monitoring means 104 monitors a temperature of the fluid comprising at least one of the saltwater and the returned salt-diminished brine being directed to the HPRO inlet 103 via the return conduit 123. A suitable temperature monitoring means 104 may comprise, but is not limited to, a thermometer, a thermocouple, a thermistor, an infrared sensor, and a resistance temperature detector. The temperature controlling means 105 controls the temperature of the fluid directed to the HPRO inlet 103 to a preset range between 10-30° C. A suitable temperature controlling means 105 may comprise, but is not limited to, a heat pump and a heat exchanger connected to a heating and a cooling source. Controlling the temperature of the fluid directed to the HPRO inlet 103 facilitates operating the HPRO unit 110 at a hydraulic pressure of at least 1,500 psi. It has been experimentally found that, in at least some example embodiments, salt crystallization takes place within the HPRO unit 110 when the temperature of the fluid at the HPRO inlet is below 10° C., causing salt scaling in the HPRO unit 110 and rupture of the HPRO unit's 110 membrane. On the other hand, when the temperature of the fluid at the HPRO inlet is above 30° C., salt ions break through the HPRO unit's 110 membrane and transfer from the HPRO concentrated brine into the HPRO permeate, producing an HPRO permeate not qualified for end-use or discharge. The HPRO unit 110 may also fail (e.g. rupture of glue line of HPRO unit 110) during a week of concentrating the fluid when operating the HPRO unit 110 at a temperature above 30° C.

The salt-diminished brine from the solids-liquid separator 121 in at least some example embodiments has a relatively low temperature (e.g. below 15° C.) and can be used to cool the concentrated brine produced by and discharged from the HPRO unit 110 through the heat energy transfer means 114. In the embodiment shown in FIG. 2, the heat energy transfer means 114 comprises a cooling-heating circuit comprising a first heat exchanger 124 positioned to receive concentrated brine discharged from the brine outlet 112, a second heat exchanger 125 positioned to receive returned salt-diminished brine being returned using the return conduit 123, and a heat pump 126 fluidly coupling the first and the second heat exchangers 124, 125 to transfer heat from the brine flowing to the cooling crystallizer 120 to the salt-diminished brine being returned. In an alternative embodiment (not shown in FIG. 2), the heat energy transfer means 114 is a heat exchanger (not shown) fluidly coupled to the brine outlet 112 and the return conduit 123. The concentrated brine from the brine outlet 112 and the returned salt-diminished brine in the return conduit 123 respectively flow through a first portion and a second portion of the heat exchanger of this alternative embodiment, and the heat exchanger transfers heat energy from the concentrated brine to the salt-diminished brine.

During the operation of the system 200, membrane-fouling organics and/or silica may accumulate in the fluidic circuit comprising the HPRO unit 110, the cooling crystallizer 120, and the solids-liquid separator 121. The organics-rich and silica-rich concentrated brine may be blown down via a conduit 113 out of the system 200 at a preset time.

It is contemplated that any part of any aspect or embodiment discussed in this specification can be implemented or combined with any part of any other aspect or embodiment discussed in this specification. One or more example embodiments have been described by way of illustration only. This description is presented for purposes of illustration and description but is not intended to be exhaustive or limited to the form disclosed. It will be apparent to persons skilled in the art that a number of variations and modifications can be made without departing from the scope of the claims.

The invention claimed is:

1. A process for crystallizing solid salts from a saltwater, the process comprising:
   (a) applying reverse osmosis at a hydraulic pressure of at least 1,500 psi to a fluid comprising the saltwater and a returned salt-diminished brine from treating the saltwater with the process to produce a permeate and a concentrated brine from the fluid;
   (b) cooling the concentrated brine to crystallize the solid salts and to produce a salt-diminished brine from the concentrated brine, wherein the salt-diminished brine comprises salts identical to, and lower in concentration than, salts of the concentrated brine;
   (c) separating at least some of the solid salts and the salt-diminished brine from each other; and
   (d) returning, without further reduction in salt concentration, at least some of the separated salt-diminished brine as the returned salt-diminished brine.

2. The process of claim 1, further comprising controlling a temperature of the fluid such that the temperature of the fluid is within a range of 10 to 30 degrees Celsius when the reverse osmosis is applied.

3. The process of claim 2, further comprising monitoring the temperature of the fluid and controlling the temperature in response to the monitoring.

4. The process of claim 1, wherein the cooling of the concentrated brine to crystallize the solid salts comprises transferring heat energy from the concentrated brine to the returned salt-diminished brine while the returned salt-diminished brine is being returned for application of reverse osmosis.

5. The process of claim 4, wherein the returned salt-diminished brine has a temperature of less than 15 degrees Celsius prior to receiving the heat energy from the concentrated brine.

6. The process of claim 1, wherein the concentrated brine has a total dissolved solids content of at least 150,000 mg/L.

7. The process of claim 6, wherein the solid salts comprise at least one of sodium bicarbonate crystals, sodium carbonate hydrate crystals, sodium sulfate hydrate crystals and potassium sulfate crystals.

8. The process of claim 1, wherein the reverse osmosis applied at the hydraulic pressure of at least 1,500 psi is applied using a reverse osmosis unit comprising a spiral wound membrane module.

9. The process of claim 8, wherein the reverse osmosis is applied using a reverse osmosis unit comprising a thin-film composite membrane that comprises a polyamide selective layer.

10. The process of claim 1, wherein the reverse osmosis is applied at a hydraulic pressure of no more than 6,000 psi.

11. A system for crystallizing solid salts from a saltwater, the system comprising:

(a) a high-pressure reverse osmosis ("HPRO") unit configured to operate at a hydraulic pressure of at least 1,500 psi, the HPRO unit comprising an inlet for receiving a fluid comprising the saltwater and a returned salt-diminished brine resulting from treating the saltwater by the system, a permeate outlet for outputting a permeate, and a brine outlet for outputting a concentrated brine;

(b) a cooling crystallizer fluidly coupled to the brine outlet to receive the concentrated brine, wherein the cooling crystallizer is configured to cool the concentrated brine to crystallize the solid salts from the concentrated brine and to produce a salt-diminished brine comprising salts identical to, and lower in concentration than, salts of the concentrated brine;

(c) a solids-liquid separator fluidly coupled to the cooling crystallizer to receive the solid salts and the salt-diminished brine, the solids-liquid separator configured to separate at least some of the solid salts from the salt-diminished brine; and (d) a return conduit fluidly coupling the solids-liquid separator to the inlet of the HPRO unit for returning, without further reduction in salt concentration, at least a portion of the salt-diminished brine as the returned salt-diminished brine.

12. The system of claim 11, further comprising a temperature controlling means fluidly coupled to the inlet of the HPRO unit for controlling a temperature of the fluid to be within a range of 10 to 30 degrees Celsius at the inlet of the HPRO unit.

13. The system of claim 12, further comprising a temperature monitoring means fluidly coupled to the inlet of the HPRO unit for monitoring a temperature of the fluid, and wherein the temperature controlling means controls the temperature in response to temperature monitoring performed by the temperature monitoring means.

14. The system of claim 11, further comprising a heat energy transfer means fluidly coupled to the brine outlet of the HPRO unit and the return conduit for transferring heat energy from the concentrated brine to the returned salt-diminished brine in the return conduit.

15. The system of claim 11, wherein the HPRO unit comprises a spiral wound membrane module.

16. The system of claim 11, wherein the HPRO unit comprises a thin-film composite membrane that comprises a polyamide selective layer.

17. The system of claim 11, wherein the HPRO unit is configured to operate at a hydraulic pressure of up to 6,000 psi.

* * * * *